(12) United States Patent
Yamada

(10) Patent No.: US 10,691,099 B2
(45) Date of Patent: Jun. 23, 2020

(54) MOTOR SELECTION APPARATUS

(71) Applicant: FANUC CORPORATION, Yamanashi (JP)

(72) Inventor: Yasuo Yamada, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 189 days.

(21) Appl. No.: 15/915,523

(22) Filed: Mar. 8, 2018

(65) Prior Publication Data

US 2018/0267501 A1 Sep. 20, 2018

(30) Foreign Application Priority Data

Mar. 14, 2017 (JP) ................. 2017-049078

(51) Int. Cl.
*G06G 7/48* (2006.01)
*G05B 19/404* (2006.01)
*B23Q 3/18* (2006.01)

(52) U.S. Cl.
CPC ............ *G05B 19/404* (2013.01); *B23Q 3/18* (2013.01); *G05B 2219/35124* (2013.01); *G05B 2219/39188* (2013.01)

(58) Field of Classification Search
None
See application file for complete search history.

(56) References Cited

U.S. PATENT DOCUMENTS

| 7,503,691 B2 * | 3/2009 | Kojima ............ B23Q 11/0007 374/141 |
| 8,528,447 B2 | 9/2013 | Tatsuda |
| 10,102,314 B2 | 10/2018 | Miura et al. |
| 2007/0187367 A1 * | 8/2007 | Kita .................. B23H 7/26 219/69.11 |
| 2016/0327934 A1 * | 11/2016 | Morimoto ............ B25J 9/1653 |

FOREIGN PATENT DOCUMENTS

| CN | 104396140 A | 3/2015 |
| JP | H01209048 A | 8/1989 |
| JP | H06038466 A | 2/1994 |
| JP | 2003099479 A | 4/2003 |

(Continued)

*Primary Examiner* — Rehana Perveen
*Assistant Examiner* — Nithya J. Moll
(74) *Attorney, Agent, or Firm* — RatnerPrestia

(57) ABSTRACT

A motor selection apparatus includes: a mechanical condition obtainment unit that obtains information pertaining to a distance between a center of mass of a workpiece and a rotation center of a motor; an operating pattern obtainment unit that obtains information pertaining to an operating pattern; a motor information obtainment unit that obtains information pertaining to instantaneous torque; an eccentric load torque calculation unit that calculates eccentric load torque, which is load torque acting on the motor in accordance with the rotation phase of the motor; an acceleration/deceleration torque calculation unit that calculates acceleration/deceleration torque; a required torque calculation unit that calculates a required torque from a sum of the eccentric load torque and the acceleration/deceleration torque; and a motor selection unit that determines whether a motor can be selected, based on whether the required torque is less than or equal to the instantaneous torque of the motor.

3 Claims, 14 Drawing Sheets

(56) References Cited

FOREIGN PATENT DOCUMENTS

| JP | 2006260350 A | 9/2006 |
|---|---|---|
| JP | 2009255266 A | 11/2009 |
| JP | 2010187464 A | 8/2010 |
| JP | 2015-027244 A | 2/2015 |
| JP | 2015192475 A | 11/2015 |

* cited by examiner

WHEN ECCENTRIC LOAD TORQUE NOT TAKEN INTO CONSIDERATION

INSTANTANEOUS TORQUE OF MOTOR ≤ REQUIRED TORQUE
(CANNOT SELECT)

WHEN ECCENTRIC LOAD TORQUE TAKEN INTO CONSIDERATION

INSTANTANEOUS TORQUE OF MOTOR > REQUIRED TORQUE
(CAN SELECT)

STATE 2

STATE 3

MOTOR SELECTION APPARATUS

This application is a new U.S. patent application that claims benefit of JP 2017-049078 filed on Mar. 14, 2017, the content of 2017-049078 is incorporated herein by reference.

BACKGROUND OF THE INVENTION

1. Field of the Invention

The present invention relates to a motor selection apparatus.

2. Description of the Related Art

A motor selection apparatus that uses information pertaining to effective torque has been known thus far (e.g., JP 2015-027244 A). A motor selection method using a motor selection apparatus according to the related art will be briefly described. First, a maximum output torque, dynamic friction torque, constant load, acceleration time, a constant velocity time, a deceleration time, and a stop time stored by a storage unit are read out. Next, the torque during the acceleration time is computed by adding the maximum output torque, the dynamic friction torque, and the constant load. The torque during the constant velocity time is computed by adding the dynamic friction torque and the constant load. The torque during the deceleration time is computed by adding the maximum output torque, the dynamic friction torque, and the constant load produced by a load. The torque during the stop time is computed as the constant load. The effective torque is then computed by inserting the obtained torques, the acceleration time, the constant velocity time, the deceleration time, and the stop time into a prescribed equation.

SUMMARY OF THE INVENTION

The motor selection apparatus according to the related art has had a problem in that eccentric load torque is not taken into consideration when selecting a motor, and thus accurate motor selection cannot be carried out.

A motor selection apparatus according to examples of the present disclosure includes: a mechanical condition obtainment unit configured to obtain information pertaining to a distance between a center of mass of a workpiece and a rotation center of a motor, the motor driving a machine; an operating pattern obtainment unit configured to obtain information pertaining to an operating pattern executed on the workpiece by the machine; a motor information obtainment unit configured to obtain information pertaining to instantaneous torque, the instantaneous torque being a maximum torque that can be permitted by the motor; an eccentric load torque calculation unit configured to calculate eccentric load torque, the eccentric load torque being load torque acting on the motor in accordance with a rotation phase of the motor while the operating pattern is being executed, in the case where the center of mass of the workpiece is eccentric relative to the rotation center of the motor and a rotation axis is not parallel to the vertical direction; an acceleration/deceleration torque calculation unit configured to calculate acceleration/deceleration torque arising when the motor accelerates or decelerates during the execution of the operating pattern; a required torque calculation unit configured to calculate a required torque from a sum of the eccentric load torque and the acceleration/deceleration torque arising during the execution of the operating pattern; and a motor selection unit configured to determine whether a motor can be selected, based on whether the required torque is less than or equal to the instantaneous torque of the motor during the execution of the operating pattern.

BRIEF DESCRIPTION OF THE DRAWINGS

The objects, features and advantages of the invention will become more apparent from the following description of the embodiments in connection with the accompanying drawings, wherein.

DETAILED DESCRIPTION

A motor selection apparatus according to examples of the present disclosure will be described hereinafter with reference to the drawings. However, the technical scope of the present invention is not limited to these embodiments, and extends to the invention as disclosed in the scope of the patent claims and their equivalents.

Figure 1:
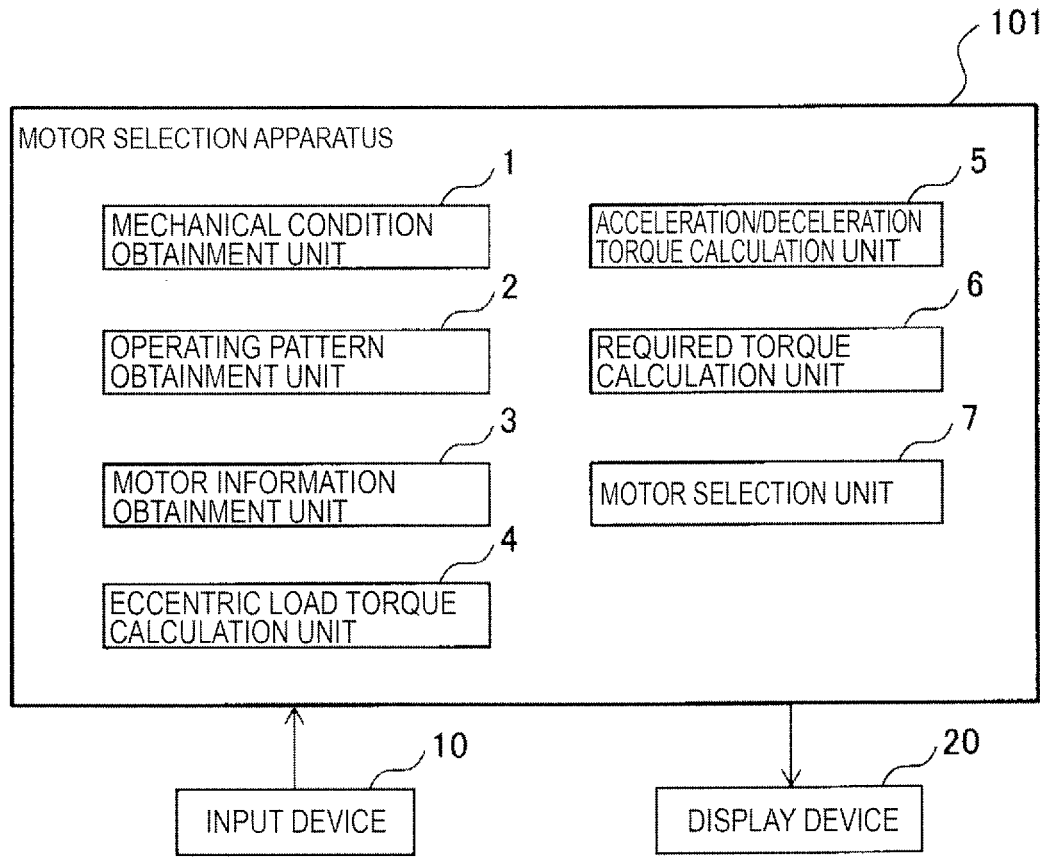
FIG. 1 is a block diagram illustrating a motor selection apparatus according to a first embodiment.

FIG. 1 is a block diagram illustrating a motor selection apparatus according to a first embodiment. A motor selection apparatus 101 according to the first embodiment includes a mechanical condition obtainment unit 1, an operating pattern obtainment unit 2, a motor information obtainment unit 3, an eccentric load torque calculation unit 4, an acceleration/deceleration torque calculation unit 5, a required torque calculation unit 6, and a motor selection unit 7.

The motor selection apparatus 101 preferably includes an input device 10 for inputting data, etc., and a display device 20 for displaying motor selection results, etc. A keyboard, a mouse, etc., can be used as the input device 10. A liquid-crystal display device, an organic EL display device, etc., can be used as the display device 20.

Figure 2:
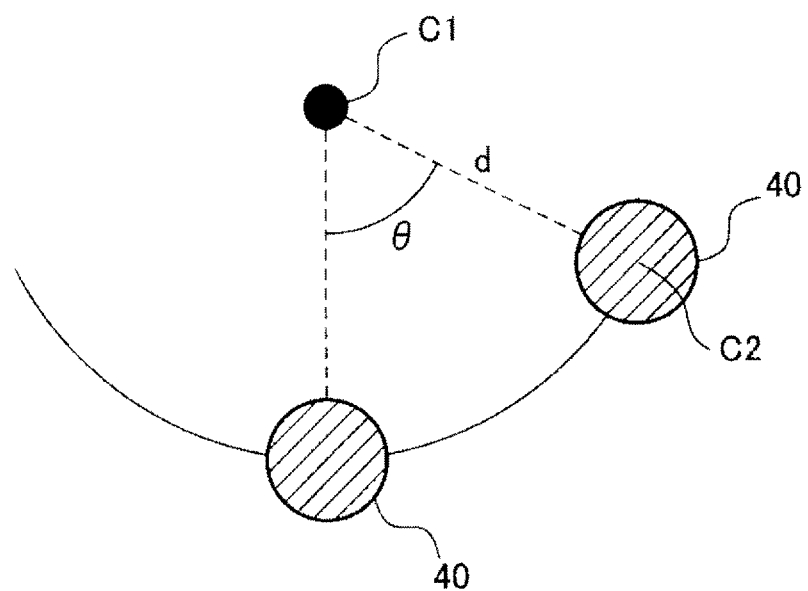
FIG. 2 is a diagram illustrating a positional relationship between a rotation center of a motor and a center of mass of a workpiece.

The mechanical condition obtainment unit 1 obtains information pertaining to a distance between a center of mass of a workpiece and a rotation center of a motor that drives a machine. FIG. 2 illustrates a positional relationship between a rotation center C1 of the motor and a center of mass C2 of the workpiece. For example, in the case where the distance between the rotation center C1 and the center of mass C2 of the workpiece is d, that value is inputted to the input device 10. The mechanical condition obtainment unit 1 may also obtain information of mechanical efficiency, a friction coefficient, the arrangement of the motor, operating ranges of the motor and axes, etc.

The operating pattern obtainment unit 2 obtains information pertaining to an operating pattern executed on the workpiece by the machine. The information pertaining to an operating pattern preferably includes at least one of a movement distance (or pivot angle) of the workpiece, a time for positioning the workpiece, an acceleration time constant of the workpiece, a movement velocity of the workpiece, and a load (a machining load, etc.). The information pertaining to the operating pattern can be inputted from the input device 10.

The motor information obtainment unit 3 obtains information pertaining to instantaneous torque, which is the maximum torque that can be permitted by the motor. In the case where there are a plurality of selection target candidate motors to be installed on the respective axes, information pertaining to each of the motors may be inputted from the input device 10. Alternatively, information pertaining to the motors stored in a storage device (not illustrated), etc., may be read from the storage device.

The eccentric load torque calculation unit 4 calculates eccentric load torque. "Eccentric load torque" refers to load torque acting on the motor in accordance with the rotation phase of the motor while the operating pattern is being executed, in the case where the center of mass of the workpiece is eccentric relative to the rotation center of the motor and the rotation axis is not parallel to the vertical direction. FIG. 2 illustrates an example of an arrangement of the rotation center of the motor and the workpiece in which eccentric load torque is generated. The center of mass C2 of a workpiece 40 is eccentric from the rotation center C1 of the motor by a distance d. At this time, the load torque acting on the motor in accordance with the rotation phase of the motor, while the operating pattern in which the workpiece 40 is moved is being executed, is eccentric load torque.

Figure 3:
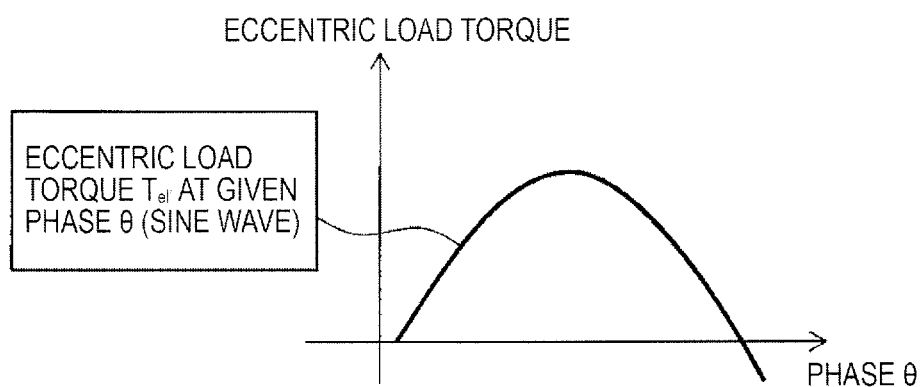
FIG. 3 is a graph illustrating a relationship between eccentric load torque and phase.

As illustrated in FIG. 2, using a position below the rotation center C1 of the motor in the vertical direction as a reference, the phase of the center of mass C2 of the workpiece is θ. At this time, an eccentric load torque $T_{el'}$ at a given phase θ is expressed as a sine wave, as illustrated in FIG. 3.

Figure 4:
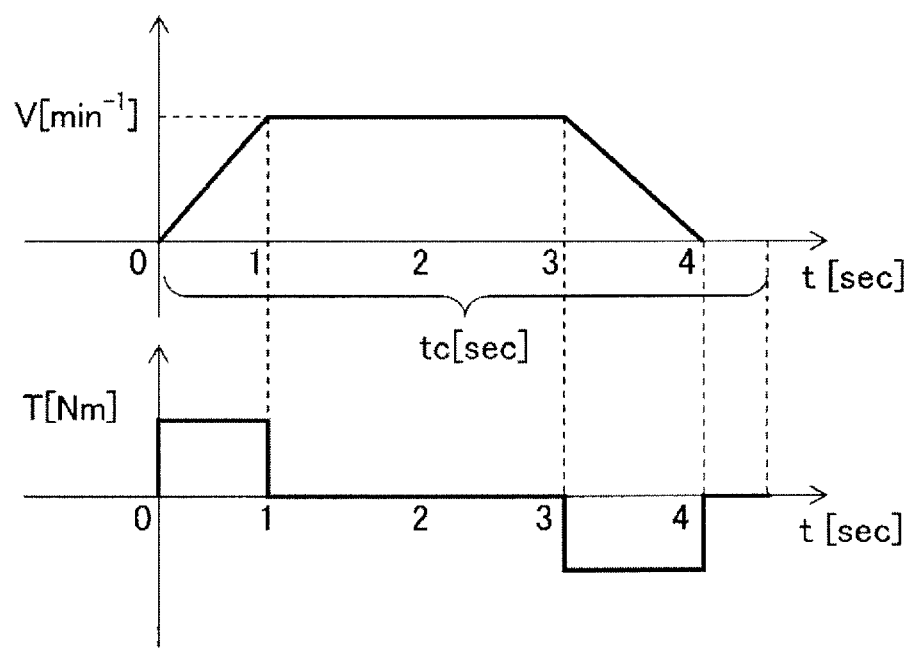
FIG. 4 is a graph illustrating changes over time in velocity and acceleration/deceleration torque in the motor selection apparatus according to the first embodiment.

The acceleration/deceleration torque calculation unit 5 calculates acceleration/deceleration torque arising when the motor accelerates or decelerates during the execution of the operating pattern. FIG. 4 indicates changes over time in a velocity V and acceleration/deceleration torque T in the motor selection apparatus according to the first embodiment. In FIG. 4, the period of time t from 0 [sec] to 4 [sec] corresponds to a period in which the operating pattern is executed. An example in which the workpiece is moved while varying the velocity as indicated in the upper part of FIG. 4 will be described as one example. In the period from a time t of 0 to 1 sec, the velocity V [$min^{-1}$] is increased at a constant acceleration. At this time, a constant acceleration torque is generated as indicated in the bottom part of FIG. 4. In the period from a time t of 1 to 3 sec, the workpiece is moved at a constant velocity. No acceleration/deceleration torque is generated at this time. In the period of time t from 3 [sec] to 4 [sec], the velocity V [$min^{-1}$] is reduced at a constant acceleration. A constant deceleration torque is generated at this time.

Figure 5A:
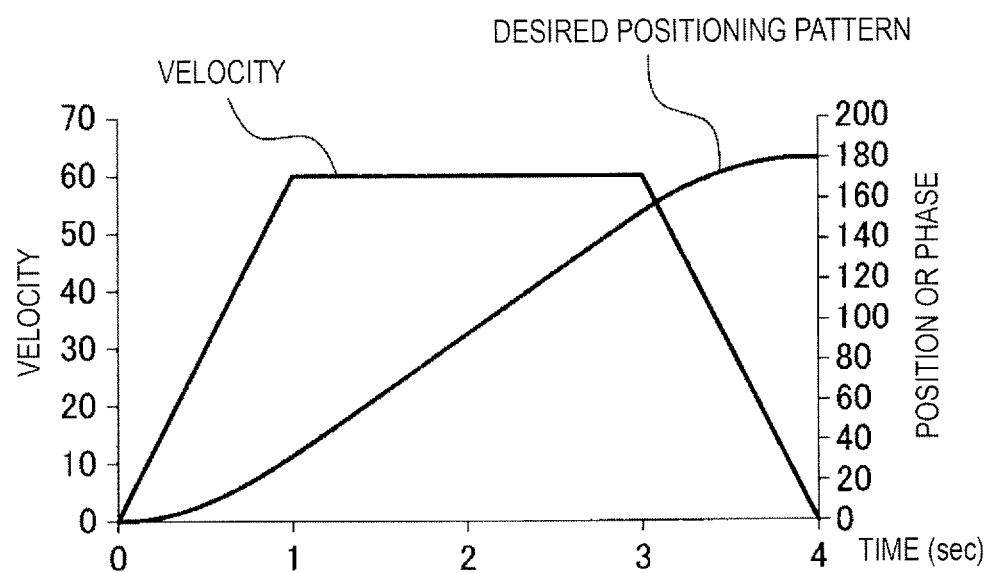
FIG. 5A is a graph illustrating changes over time in velocity and a workpiece position in the motor selection apparatus according to the first embodiment.

The required torque calculation unit 6 calculates a required torque from the sum of the eccentric load torque and the acceleration/deceleration torque arising during the execution of the operating pattern. "Required torque" refers to the torque required to operate the workpiece. FIG. 5A indicates changes over time in the velocity and the position of the workpiece in the motor selection apparatus according to the first embodiment. The position of the workpiece is determined in accordance with a desired positioning pattern. The Y axis on the left side represents velocity, whereas the Y axis on the right side represents position or phase. The changes over time in the velocity are the same as in the example indicated in the upper part of FIG. 4. The desired positioning pattern is an operating pattern in which the workpiece is moved to a desired position (phase). The workpiece is moved slowly in the period of time from 0 [sec] to 1 [sec]. The workpiece is then moved at a constant velocity in the period of time from 1 [sec] to 3 [sec]. In the period of time from 3 [sec] to 4 [sec], the velocity of the workpiece is gradually reduced, and the workpiece is stopped at 4 [sec].

Figure 5B:
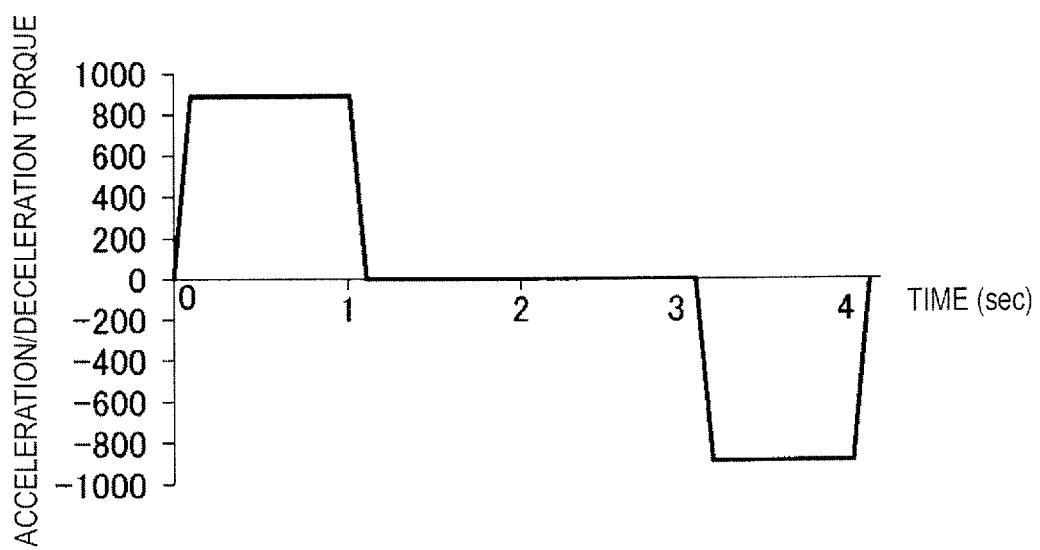
FIG. 5B is a graph illustrating changes over time in acceleration/deceleration torque in the motor selection apparatus according to the first embodiment.

FIG. 5B indicates changes over time in the acceleration/deceleration torque in the motor selection apparatus according to the first embodiment. The changes over time in the acceleration/deceleration torque are the same as in the example indicated in the lower part of FIG. 4.

Figure 5C:
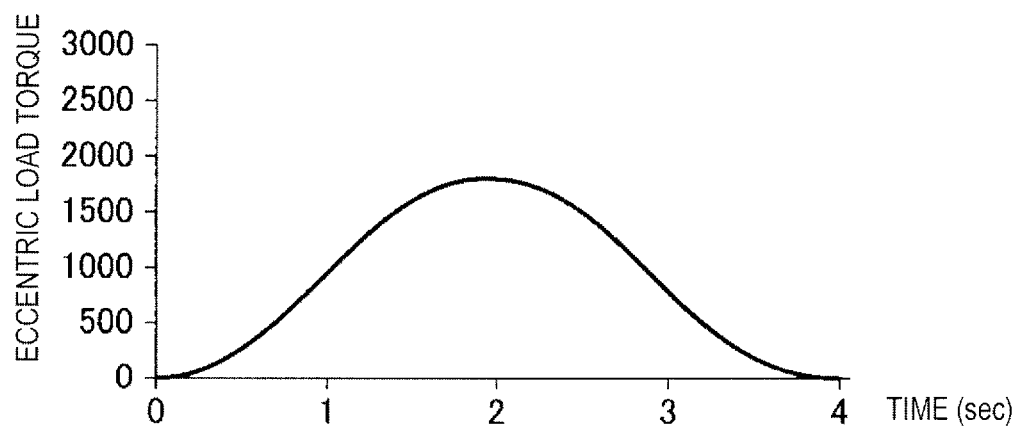
FIG. 5C is a graph illustrating changes over time in eccentric load torque in the motor selection apparatus according to the first embodiment.

FIG. 5C indicates changes over time in eccentric load torque in the motor selection apparatus according to the first embodiment. The eccentric load torque is 0 at 0 [sec] and 4 [sec], and is maximum at 2 [sec].

Figure 5D:
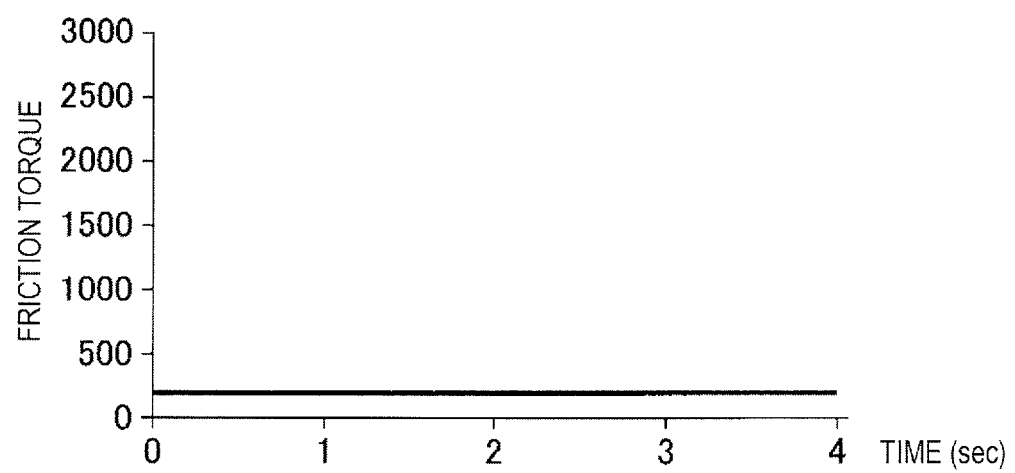
FIG. 5D is a graph illustrating changes over time in friction torque in the motor selection apparatus according to the first embodiment.

FIG. 5D indicates changes over time in friction torque in the motor selection apparatus according to the first embodiment. In the first embodiment, it is assumed that the friction torque is constant.

Figure 6:
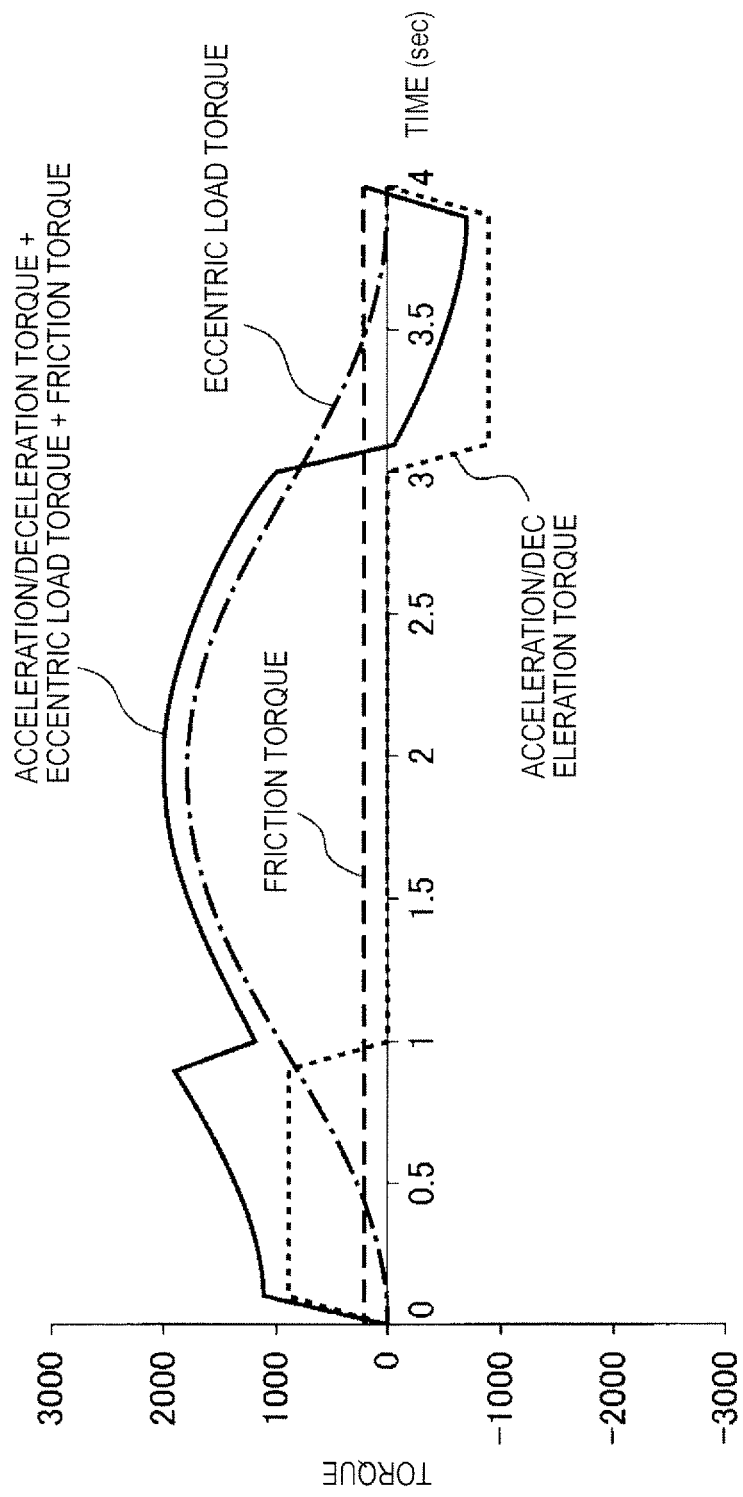
FIG. 6 is a graph illustrating changes over time in acceleration/deceleration torque, eccentric load torque, friction torque, and a value obtained by adding these torques together, in the motor selection apparatus according to the first embodiment.
Figure 7:
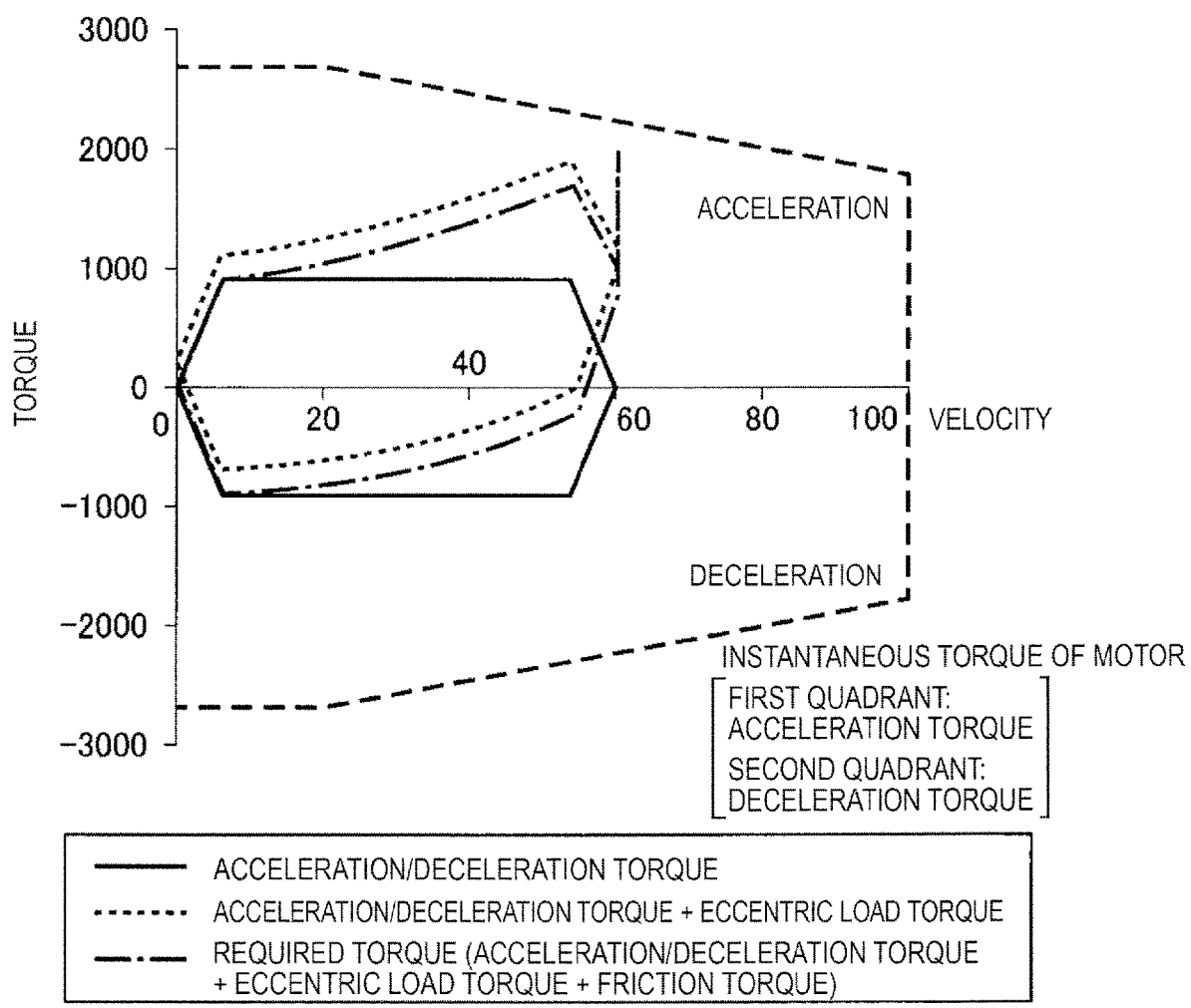
FIG. 7 is a graph illustrating a relationship between instantaneous torque and required torque of a motor and velocity, in the motor selection apparatus according to the first embodiment.

FIG. 6 indicates changes over time in the acceleration/deceleration torque, the eccentric load torque, and the friction torque indicated in FIGS. 5B to 5D, respectively, as well as a sum thereof. FIG. 5A indicates changes over time in the velocity. Accordingly, a relationship between the acceleration/deceleration torque, the eccentric load torque, the friction torque, and the required torque, which is the sum thereof, as well as the instantaneous torque and the velocity of the motor, is illustrated in FIG. 7. The solid line represents the acceleration/deceleration torque. The dotted line indicates the sum of the acceleration/deceleration torque and the eccentric load torque. The dot-dash line indicates the required torque, i.e., the sum of the acceleration/deceleration torque, the eccentric load torque, and the friction torque. Additionally, in FIG. 7, among the broken lines drawn around these curves, the broken line in the first quadrant represents the instantaneous torque of the motor during acceleration, whereas the broken line in the second quadrant represents the instantaneous torque of the motor during deceleration. In the example illustrated in FIG. 7, it can be seen that the required torque (the sum of the acceleration/deceleration torque, the eccentric load torque, and the friction torque) represented by the dot-dash line does not exceed the instantaneous torque of the motor, represented by the broken line, in all velocity ranges, and thus the motor operates normally.

Figure 8A:
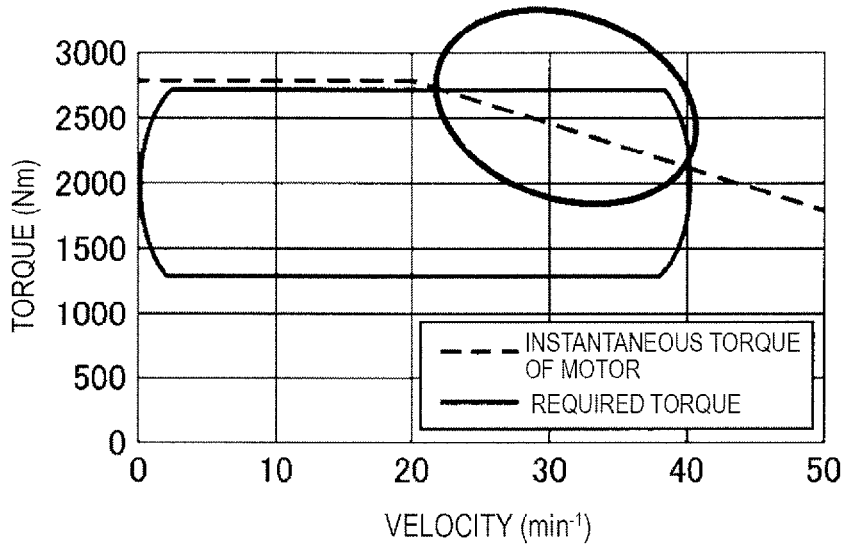
FIG. 8A is a graph illustrating a relationship between instantaneous torque and required torque of a motor and velocity in a case where eccentric load torque is not taken into consideration.
Figure 8B:
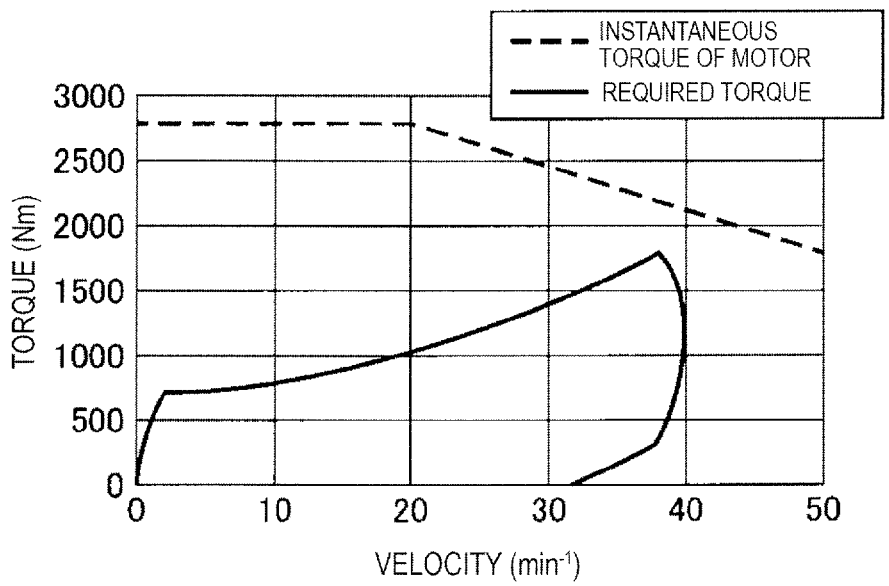
FIG. 8B is a graph illustrating a relationship between instantaneous torque and required torque of a motor and velocity in a case where eccentric load torque is taken into consideration, in the motor selection apparatus according to the first embodiment.

Next, a relationship between the torque required to operate the workpiece (the required torque) and the instantaneous torque of the motor will be described for a case where the eccentric load torque is taken into consideration and a case where the eccentric load torque is not taken into consideration. FIG. 8A indicates the relationship between the instantaneous torque and the required torque of the motor and velocity in a case where the eccentric load torque is not taken into consideration. FIG. 8B indicates the relationship between the instantaneous torque and the required torque of the motor and velocity in a case where the eccentric load torque is taken into consideration, in the motor selection apparatus according to the first embodiment.

The motor selection unit 7 determines whether a motor can be selected on the basis of whether the required torque is less than or equal to the instantaneous torque of the motor while the operating pattern is being executed. As indicated in FIG. 8A, in the case where the eccentric load torque is not taken into consideration, the required torque (the solid line) is equal to or greater than the instantaneous torque of the motor (the broken line) in the velocity region surrounded by the oval. In such a case, the required torque exceeds the instantaneous torque, which is the maximum torque the motor can output. As a result, it is assumed that the required torque cannot be obtained in this velocity region, and thus it is determined that the motor in question cannot be selected. This is because the fact that the eccentric load torque changes depending on the phase is not taken into consideration in the related art, and thus the required torque is calculated assuming a constant load at all phases. That is, in the related art, rather than calculating the phase dependence of the eccentric load torque, and it is assumed that a constant load will be generated, and there has thus been a risk that the required torque will be overestimated. As a result, there have been cases where rather than selecting the motor that originally should be selected, the motor selection cannot be carried out properly due to excessive performance being requested, etc.

On the other hand, as illustrated in FIG. 8B, with the motor selection apparatus according to the first embodiment, the required torque is lower than the instantaneous torque of the motor in all velocity regions in the case where the eccentric load torque is taken into consideration. In such a case, the required torque can be obtained in all velocity regions in which the workpiece operates according to the operating pattern, and thus it can be determined that the motor in question can be selected.

In this manner, with the motor selection apparatus according to the first embodiment, the velocity dependence of the eccentric load torque is taken into consideration, which makes it possible to prevent the required torque from being overestimated as a result of assuming the eccentric load torque is constant as in the past. The motor can be selected appropriately as a result.

Figure 9:
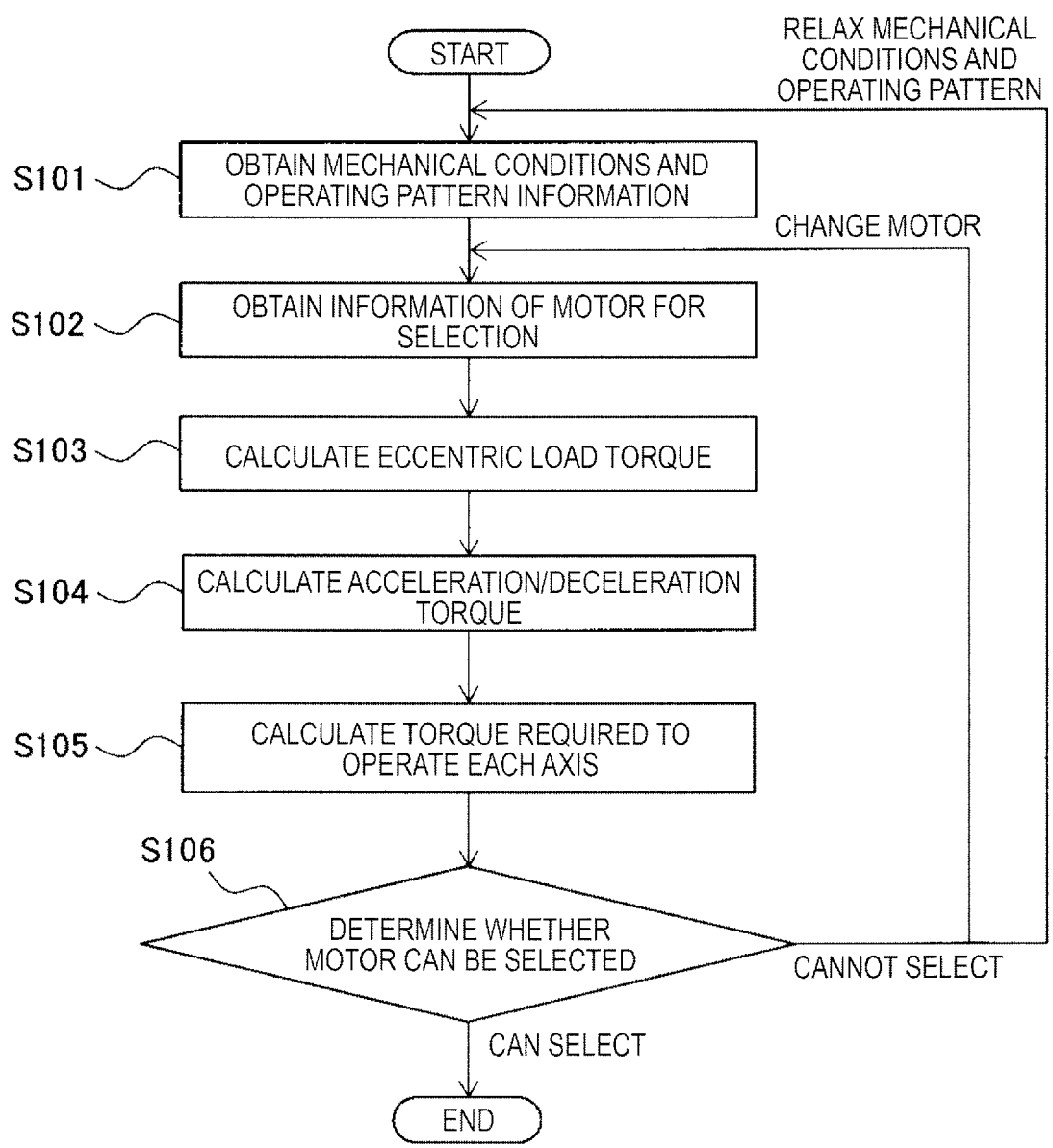
FIG. 9 is a flowchart illustrating a motor selection sequence carried out by the motor selection apparatus according to the first embodiment.

Next, a motor selection sequence using the motor selection apparatus according to the first embodiment will be described. FIG. 9 is a flowchart illustrating a motor selection sequence carried out by the motor selection apparatus according to the first embodiment. First, in step S101, the mechanical condition obtainment unit 1 obtains mechanical conditions, and the operating pattern obtainment unit 2 obtains operating pattern information. The mechanical conditions include information pertaining to the distance between the center of mass of the workpiece and the rotation center of the motor that drives the machine. Information of the mechanical efficiency, the friction coefficient, the arrangement of the motor, operating ranges of the motor and axes, etc., may be obtained as well. The information pertaining to the operating pattern preferably includes at least one of a movement distance (or pivot angle) of the workpiece, a time for positioning the workpiece, an acceleration time constant of the workpiece, a movement velocity of the workpiece, and a load (a machining load, etc.).

Next, in step S102, the motor information obtainment unit 3 obtains information of the motors to be selected. Information pertaining to the instantaneous torque, which is the maximum torque permitted by the motor, is included in the motor information. In the case where there are a plurality of selection target candidate motors to be installed on the respective axes, information pertaining to each of the motors may be obtained. Alternatively, the motor information obtainment unit 3 may read information pertaining to the motors stored in a storage device (not illustrated), etc., from the storage device.

Next, in step S103, the eccentric load torque calculation unit 4 calculates the eccentric load torque. The method for calculating the eccentric load torque will be described later.

Next, in step S104, the acceleration/deceleration torque calculation unit 5 calculates the acceleration/deceleration torque. The acceleration/deceleration torque is torque arising when the motor accelerates or decelerates while the operating pattern is being executed.

Next, in step S105, the required torque calculation unit 6 calculates the torque required for each axis to operate. For example, in the case where the machine is a six-axis robot, values of the torque required for each axis are calculated. With the motor selection apparatus according to the first embodiment, the required torque is the sum of the eccentric load torque, the acceleration/deceleration torque, and the friction torque arising while the operating pattern is being executed. However, in the first embodiment, it is assumed that the friction torque is constant, regardless of the phase.

Next, in step S105, the motor selection unit 7 determines whether the motor in question can be selected. Specifically, the motor selection unit 7 determines whether the motor can be selected on the basis of whether the required torque is less than or equal to the instantaneous torque of the motor while the operating pattern is being executed. This determination is made on the basis of whether the required torque exceeds the instantaneous torque of the motor in the period when the motor is executing the operating pattern.

In addition to this determination, whether the motor can execute continuous operations may also be determined. The determination as to whether continuous operations are possible is made by determining whether a mean square torque arising while the operating pattern is being executed is less than the continuous torque of the motor.

Using the operating pattern indicated in FIG. 4 as an example, a mean square torque Ts [Nm] can be expressed through Equation (1) below.

$$Ts = \sqrt{\frac{1}{tc} \int (T(t))^2 dt} \quad (1)$$

"tc" represents the time in which one operating pattern is executed.

In step S106, the motor selection process ends in the case where it has been determined that motor selection is possible, and a selection result is displayed in the display device 20.

However, in the case where it has been determined in step S106 that the motor in question cannot be selected as the motor to use, the sequence returns to step S102, and operations for selecting another motor are carried out. In the case where there is no other motor, the sequence may return to step S101, where the mechanical conditions and the operating pattern are relaxed, and the determination as to whether the motor in question can be selected may then be made.

Figure 10:
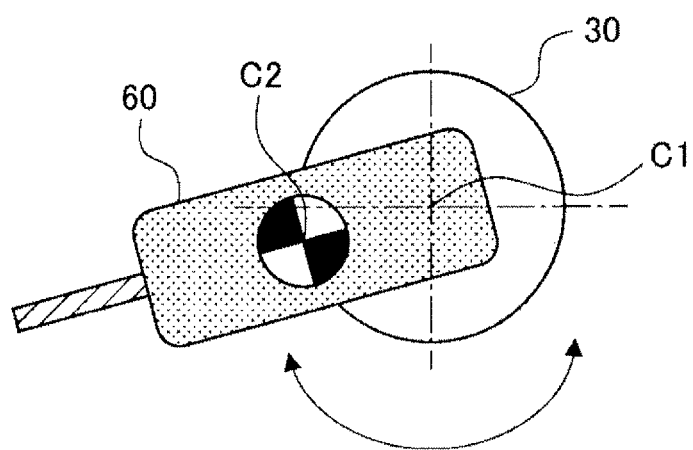
FIG. 10 is a diagram illustrating a positional relationship between a rotation center of a motor and a center of gravity of a spindle.

An example of a machine in which eccentric load torque is generated will be described next. FIG. 10 is a diagram illustrating a positional relationship between the rotation center of a motor and a center of gravity of a spindle. The rotation center C1 of a motor 30 is located in a position distanced from a center of gravity C2 of a spindle 60, and thus eccentric load torque is generated when the spindle 60 is rotated about the rotation center C1 of the motor 30, in the directions of the arrows indicated in the drawing.

Figure 11:
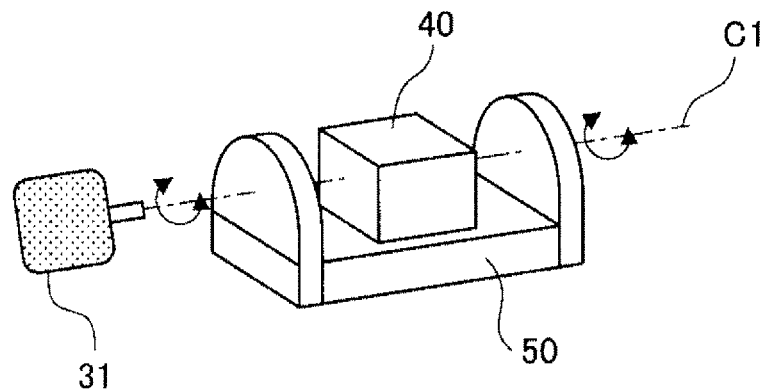
FIG. 11 is a diagram illustrating a first example of a positional relationship between a motor and a workpiece in which eccentric load torque is generated.

FIG. 11 is a diagram illustrating a first example of a positional relationship between a motor and a workpiece in which eccentric load torque is generated. The workpiece 40 is placed on a table 50. The table 50 tilts when a first motor 31 is rotated about the rotation center C1. At this time, eccentric load torque is generated in the case where the centers of gravity of both the workpiece 40 and the table 50 do not coincide with the rotation center C1.

Figure 12:
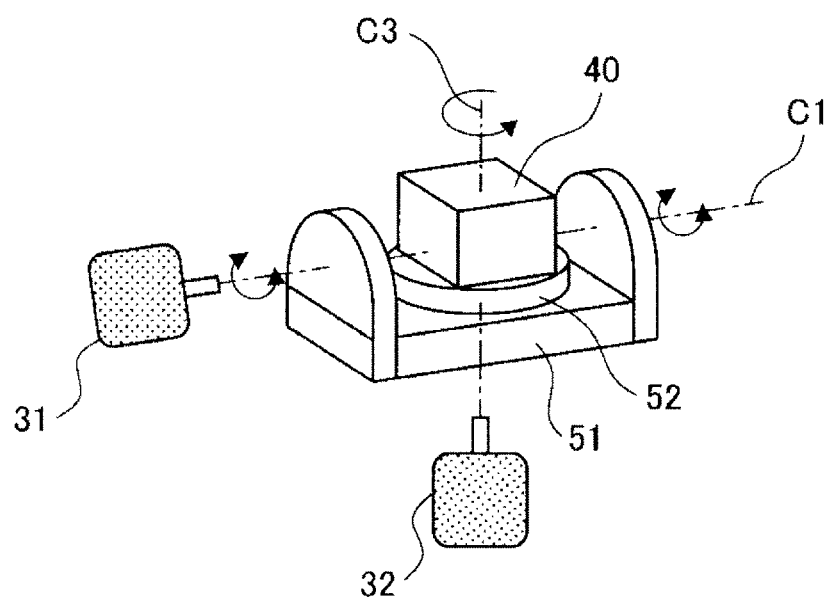
FIG. 12 is a diagram illustrating a second example of a positional relationship between a motor and a workpiece in which eccentric load torque is generated.

FIG. 12 is a diagram illustrating a second example of a positional relationship between a motor and a workpiece in which eccentric load torque is generated. A first table 51 moves with a pendulum motion about the rotation center C1 when the first motor 31 is rotated. A second table 52 is provided on the first table 51. The workpiece 40 is placed on the second table 52. The second table 52 is pivoted about a rotation center C3 by a second motor 32. At this time, eccentric load torque is generated in the case where the centers of gravity of the workpiece 40, the first table 51, and the second table 52 do not coincide with the rotation center C1.

Figure 13:
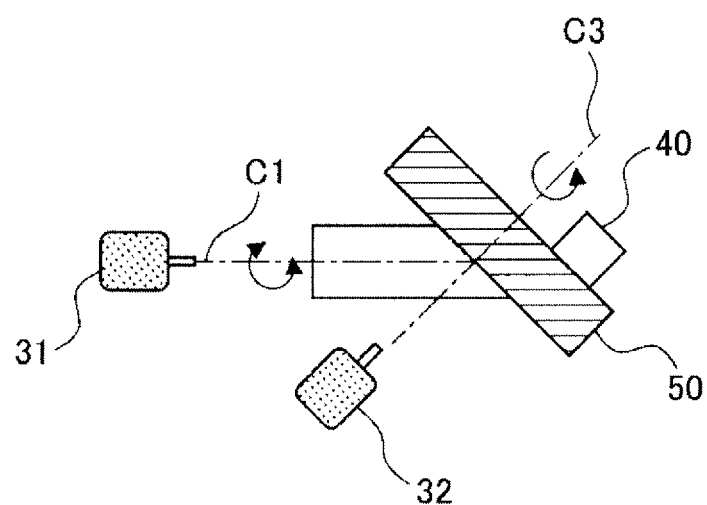
FIG. 13 is a diagram illustrating a third example of a positional relationship between a motor and a workpiece in which eccentric load torque is generated.
Figure 14:
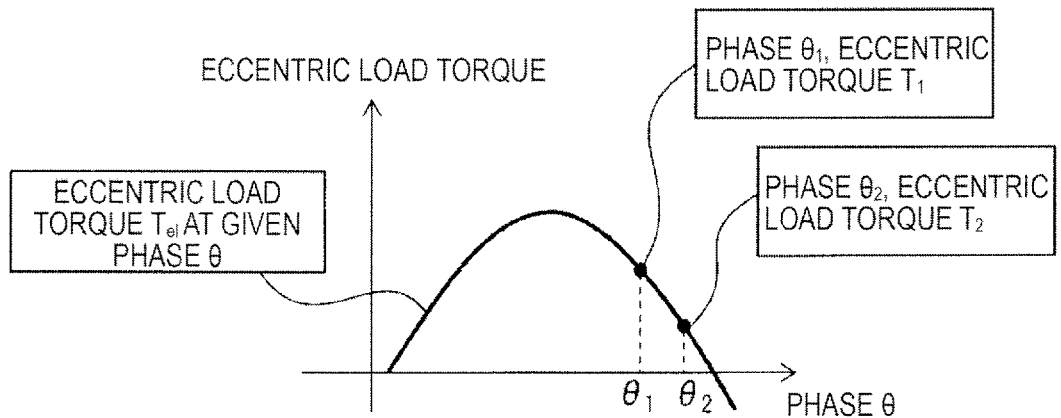
FIG. 14 is a first example of a graph illustrating a relationship between eccentric load torque and phase.

FIG. 13 is a diagram illustrating a third example of a positional relationship between a motor and a workpiece in which eccentric load torque is generated. The workpiece 40 is placed on the table 50, and the second motor 32 is rotated about the rotation center C3 such that the workpiece 40 pivots on the table 50. The table 50 tilts when the first motor 31 is rotated about the rotation center C1. At this time, eccentric load torque is generated in the case where the centers of gravity of both the workpiece 40 and the table 50 do not coincide with the rotation center C1.

Figure 15:
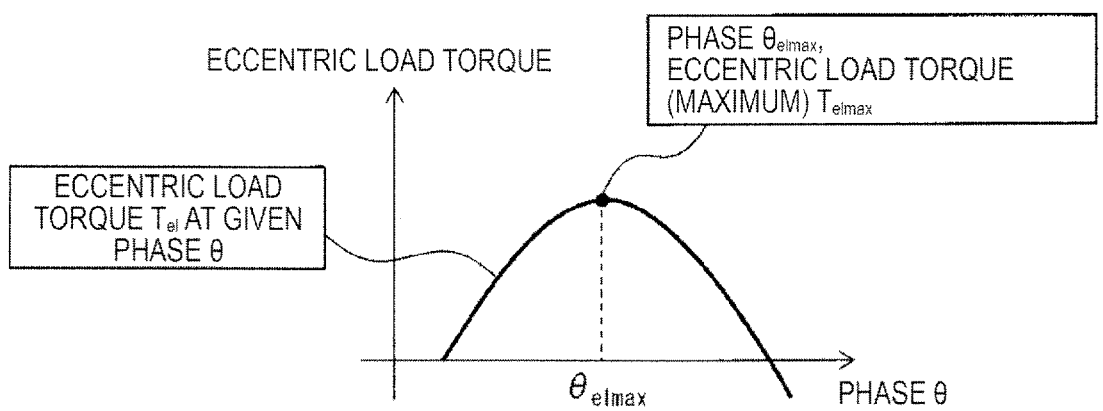
FIG. 15 is a second example of a graph illustrating a relationship between eccentric load torque and phase.

A method of calculating the eccentric load torque will be described next. FIG. 15 is a first example of a graph illustrating a relationship between the eccentric load torque and the phase. The eccentric load torque calculation unit 4 can find the eccentric load torque at a given phase from two different sets of phases and eccentric load torques. For example, in the case where the eccentric load torque is $T_1$ at a phase $\theta_1$ and the eccentric load torque is $T_1$ at a phase $\theta_2$, an eccentric load torque $T_{el}$ at a given phase $\theta$ can be found through Equations (2) to (4) below.

$$T_{el}(\theta) = |T_{el'} \sin(\theta - \theta_{el0})| \quad (2)$$

$$\theta_{el0} = \tan^{-1}\left(\frac{-T_1 \cdot \sin\theta_2 + T_2 \cdot \sin\theta_1}{-T_1 \cdot \cos\theta_2 + T_2 \cdot \cos\theta_1}\right) \quad (3)$$

$$T_{el'} = \frac{T_1}{\sin(\theta_1 - \theta_{el0})} = \frac{T_2}{\sin(\theta_2 - \theta_{el0})} \quad (4)$$

where, $\sin(\Theta_1 - \Theta_{el0}) = 0$ or $\sin(\Theta_2 - \Theta_{el0})$, $T_{el}(\Theta) = 0$.

It is preferable to select a motor taking the eccentric load torque found in this manner into consideration.

In particular, as indicated in FIG. 15, in the case where a phase $\theta_{elmax}$ where the eccentric load torque is a maximum $T_{elmax}$ is known, an eccentric load torque $T_{el}(\theta)$ at a given phase $\theta$ can be calculated through Equation (5) below.

$$T_{el}(\theta) = T_{elmax} \sin\left(\theta - \theta_{el0} - \frac{\pi}{2}\right) = T_{elmax} \cos(\theta - \theta_{el0}) \quad (5)$$

Figure 16:
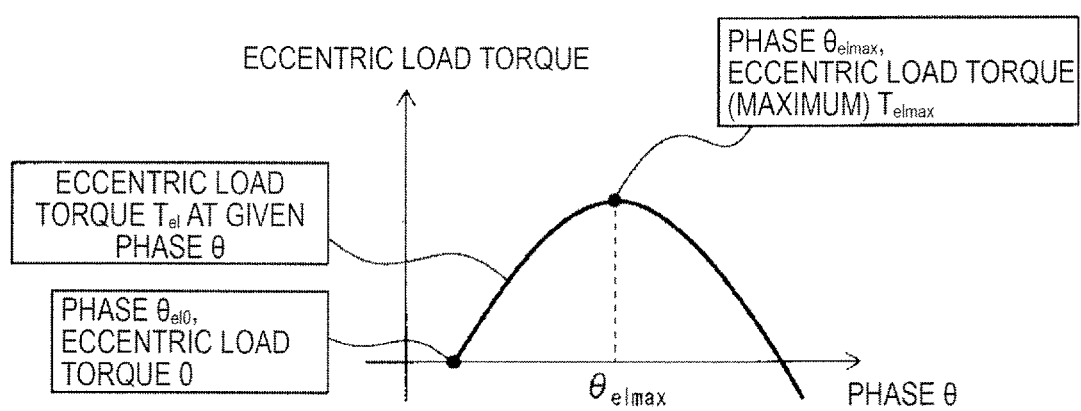
FIG. 16 is a third example of a graph illustrating a relationship between eccentric load torque and phase.

Furthermore, as illustrated in FIG. 16, in the case where a phase $\theta_{el0}$ at which the eccentric load torque is 0 is known, the eccentric load torque $T_{el}(\theta)$ at a given phase $\theta$ can be calculated through Equation (6) below.

$$T_{el}(\theta) = \left|\frac{T_{elmax} \sin(\theta - \theta_{el0})}{\sin(\theta_{elmax} - \theta_{el0})}\right| \quad (6)$$

where, $\sin(\Theta_{elmax}-\Theta_{el0})=0$, $T_{el}(\Theta)=0$

Figure 17:
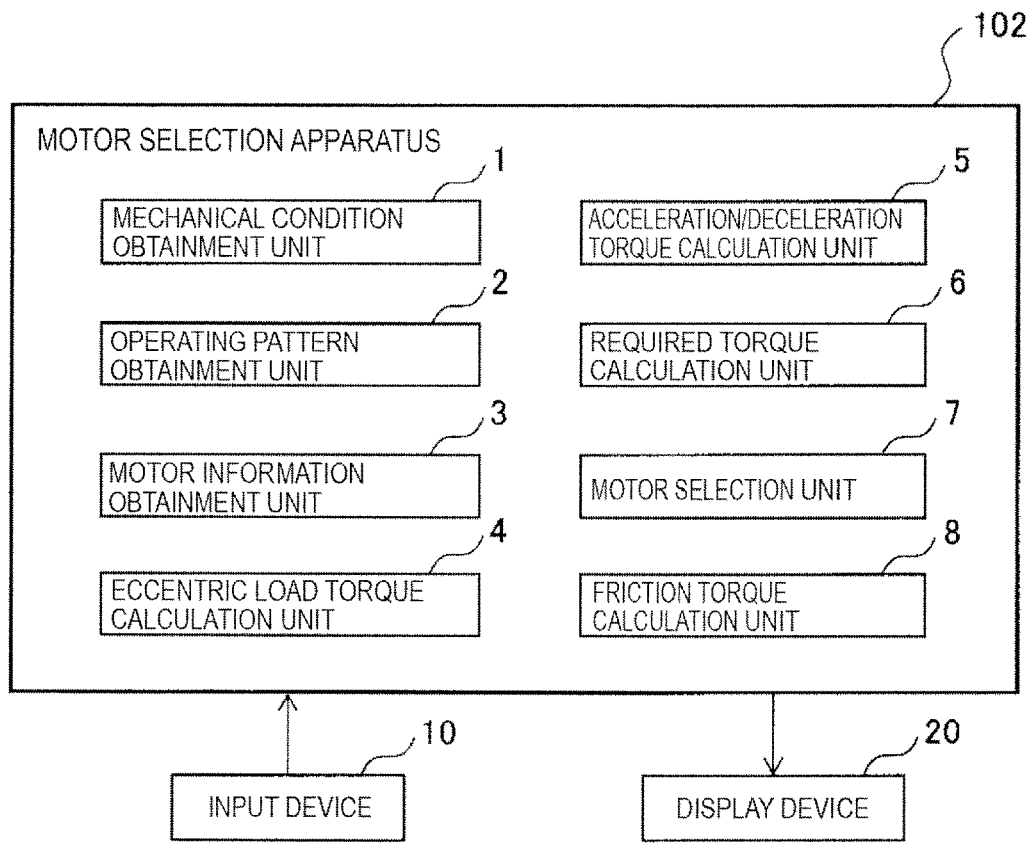
FIG. 17 is a block diagram illustrating a motor selection apparatus according to a second embodiment.

Next, a motor selection apparatus according to a second embodiment will be described. FIG. 17 is a block diagram illustrating the motor selection apparatus according to the second embodiment. A motor selection apparatus 102 according to the second embodiment differs from the motor selection apparatus 101 according to the first embodiment in that the motor selection apparatus 102 further includes a friction torque calculation unit 8 that finds the friction torque by multiplying a distance between a friction surface and the rotation center of a motor by a friction force, and that the required torque calculation unit calculates the required torque by adding the friction torque to the eccentric load torque. The other configurations of the motor selection apparatus 102 according to the second embodiment are similar to those of the motor selection apparatus 101 according to the first embodiment, and thus detailed descriptions thereof will be omitted.

The first embodiment describes an example in which the motor selection apparatus determines whether a motor can be selected assuming the friction torque is constant. However, in the case where the friction torque exceeds a set magnitude and affects the motor selection, it is preferable that the motor selection be made taking into consideration the fact that the friction torque changes depending on the phase (position).

The friction force is proportional to resistance against a sliding surface and a friction coefficient. In a case where the eccentric load is the same, the resistance in the gravity direction is the same as well. However, centrifugal force acts on the sliding surface while the motor is running, and thus the magnitude of the resistance changes depending on the phase, and the magnitude of the friction force also changes depending on the phase in a similar manner. In the motor selection apparatus according to the second embodiment, whether a motor can be selected is determined taking into consideration the friction torque that changes depending on the phase.

Figure 18:
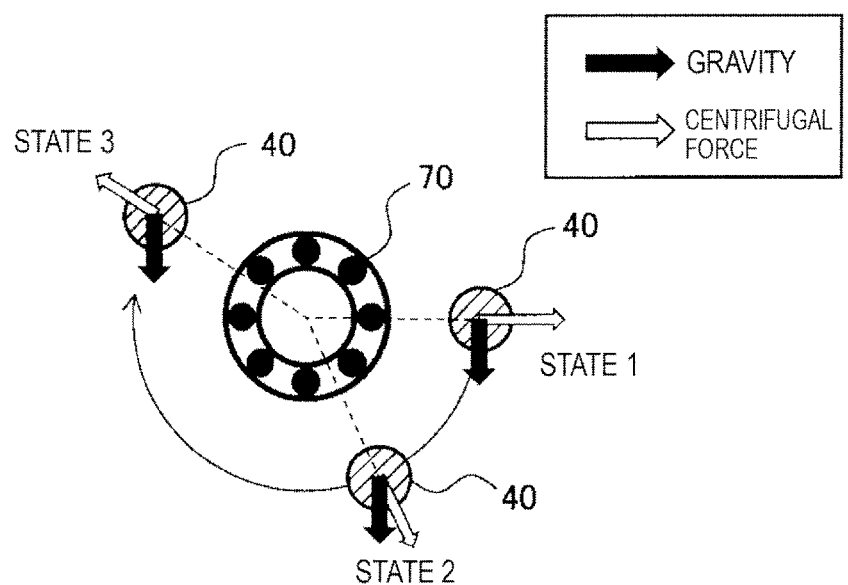
FIG. 18 is a diagram illustrating a relationship between the position of a workpiece with respect to a bearing, and gravity and centrifugal force.
Figure 19A:
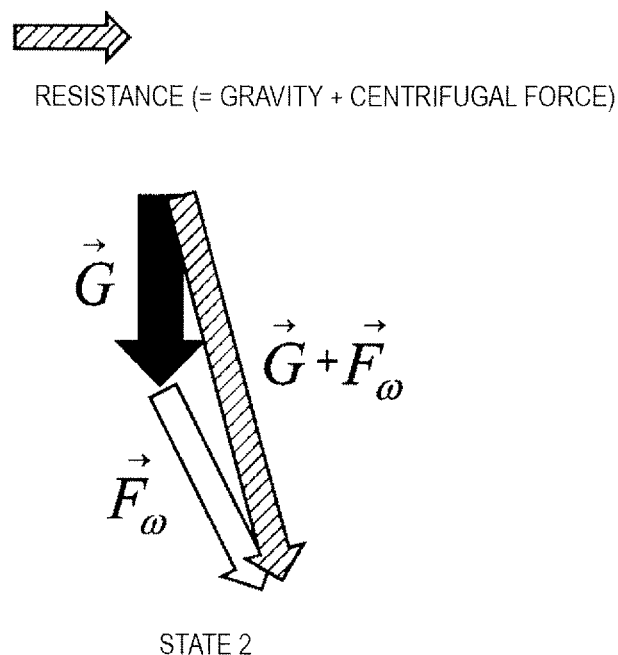
FIG. 19A is a diagram illustrating the magnitude of resistance acting on the workpiece at a given phase.
Figure 19B:
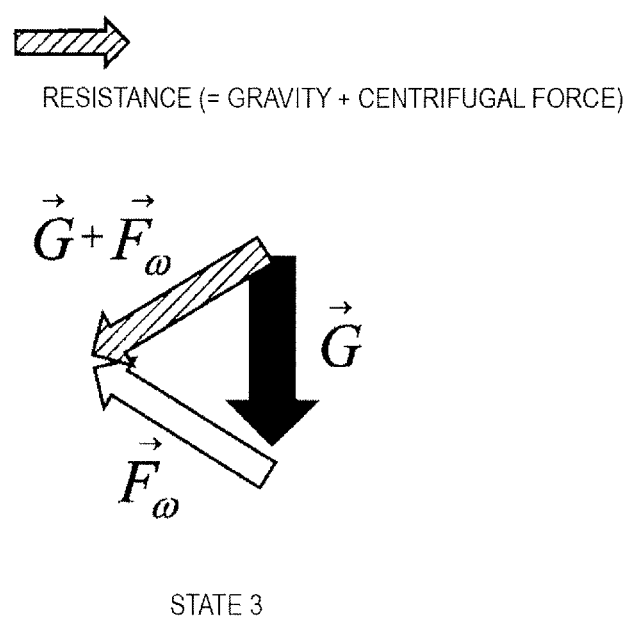
FIG. 19B is a diagram illustrating the magnitude of resistance acting on the workpiece at another phase.

FIG. 18 is a diagram illustrating a relationship between the position of a workpiece with respect to a bearing, and gravity and centrifugal force. An example in which the workpiece 40 slides in the periphery of a bearing 70 will be described here. As illustrated in FIG. 18, in all of states 1 to 3, gravity continually acts on the workpiece 40 in the vertical direction, whereas centrifugal force acts in a direction moving away from the bearing. Accordingly, assuming a force obtained by combining gravity G and centrifugal force $F_\omega$ is a resistance ($G+F_\omega$), the resistance differs depending on the phase (position) of the workpiece. FIG. 19A and FIG. 19B indicate relationships between gravity, centrifugal force, and resistance in state 2 and state 3, respectively. It can be seen, from FIG. 19A and FIG. 19B, that the resistance in state 2 is different from the resistance in state 3, and that the resistance changes depending on the phase.

Friction torque $f(\theta)$ is obtained through Equation (7) below, by multiplying a distance e between the friction surface and the motor rotation center by the friction force.

$$f(\theta) = \mu \cdot \frac{|\vec{G}+\vec{F_\omega}|}{|\vec{F_\omega}|} \cdot e \quad (7)$$

Figure 20:
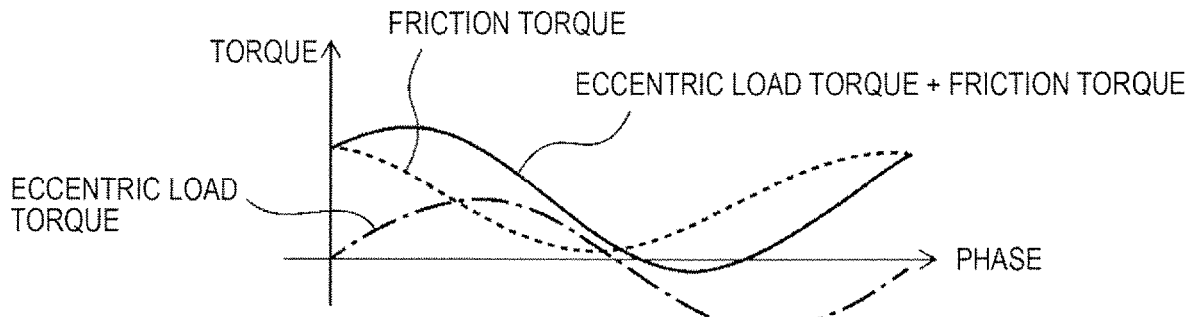
FIG. 20 is a graph illustrating a relationship between eccentric load torque, friction torque, and a sum thereof, and phase, in the motor selection apparatus according to the second embodiment.

The required torque calculation unit 6 calculates the required torque by adding the friction torque found through Equation (7) to the eccentric load torque. FIG. 20 indicates a relationship between the eccentric load torque, the friction torque, and a sum thereof, and phase, in the motor selection apparatus according to the second embodiment. Unlike the first embodiment, it can be seen that the friction torque changes depending on the phase in the second embodiment. It can furthermore be seen that the phase of the friction torque is shifted from that of the eccentric load torque, and that the phase of the sum of the eccentric load torque and the friction torque in the second embodiment is shifted from that in the first embodiment. In the motor selection apparatus according to the second embodiment, selecting the motor taking into consideration the friction torque that changes depending on the phase makes it possible to accurately select the motor even in the case where the friction torque changes depending on the phase.

A case will be described in which there is a machine similar to the machine being considered for use of the motor selected by the motor selection apparatus 102 according to the second embodiment. In this case, the friction torque calculation unit 8 may use information of a motor used in the similar machine to find a polynomial approximation of a friction torque function, calculate the friction coefficient from the friction torque function, and then calculate the friction torque for the machine being considered from the friction coefficient. The required torque calculation unit 6 can calculate the required torque by adding the friction torque to the eccentric load torque of the machine being considered.

For example, current and velocity information may be obtained from the motor of a known similar machine and the friction coefficient may be derived therefrom. Furthermore, a resultant force of the centrifugal force and gravity are calculated, and the friction torque is calculated from the friction coefficient found earlier. The motor selection can be carried out having added this friction torque to the eccentric load torque of the machine being considered, which does not include friction.

Figure 21:
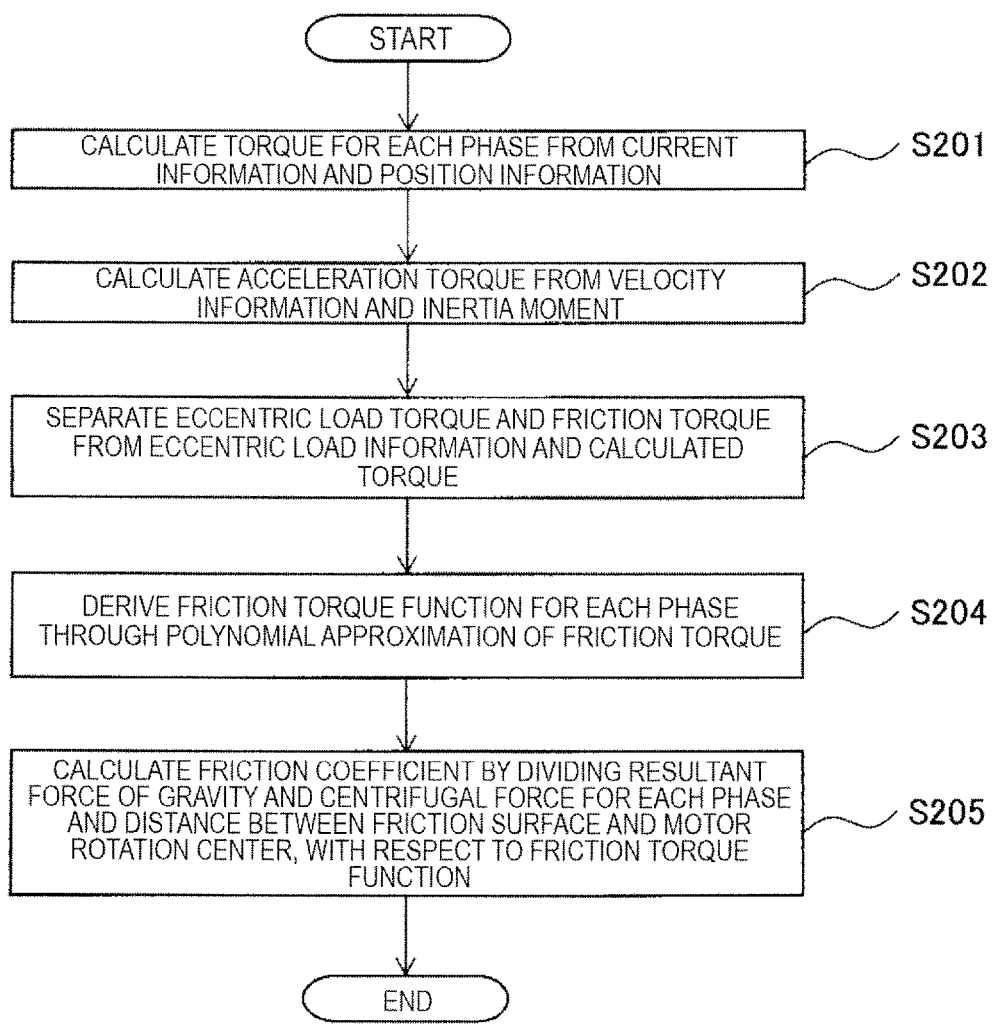
FIG. 21 is a flowchart illustrating a sequence for calculating a friction coefficient for calculating friction torque to be added to eccentric load torque, in the motor selection apparatus according to the second embodiment.

A method of calculating the friction coefficient will be described next using the flowchart illustrated in FIG. 21. First, in step S201, a torque is calculated for each phase from current information and position information. The torque is proportional to the current, and thus the torque can be calculated from the current information.

Next, in step S202, the acceleration torque is calculated from velocity information and inertia moment. It is assumed here that the inertia moment is known.

Next, in step S203, the eccentric load torque and the friction torque are separated from eccentric load information and the calculated torque. It is assumed that the eccentric load information includes information pertaining to the eccentric load torque, and is known. At this time, the current information and the velocity information are obtained in a state where operations such as machining are not underway. The friction torque is found through the following equation.

friction torque=torque−eccentric load torque−acceleration torque

Next, in step S204, a friction torque function for each phase is derived through polynomial approximation of the friction torque. This is because noise will increase if the friction torque is calculated successively without polynomial approximation.

Next, in step S205, the friction coefficient is calculated by dividing the resultant force of gravity and the centrifugal force for each phase and the distance between the friction surface and the motor rotation center, with respect to the friction torque function. Gravity for each phase and the distance between the friction surface and the motor rotation center are known. The centrifugal force can be calculated from machine information and velocity information. A friction coefficient µ is found through Equation (8) below.

$$\mu = \frac{f(\theta)}{e} \cdot \frac{|\vec{F_\omega}|}{|\vec{G} - \vec{F_\omega}|} \qquad (8)$$

In this manner, the required torque, including the eccentric load torque and the friction torque, can be calculated accurately by calculating the friction torque using a friction coefficient calculated from a similar machine. The motor can be selected accurately as a result.

With the motor selection apparatus according to Examples of the present disclosure, a motor for driving an axis in which eccentric load torque is generated, such as a slanted axis in a machine tool, can be selected accurately.

What is claimed is:

1. A motor selection apparatus comprising:
   a processor to:
   obtain information pertaining to a distance between a center of mass of a workpiece and a rotation center of a motor, the motor driving a machine;
   obtain information pertaining to an operating pattern executed on the workpiece by the machine;
   obtain information pertaining to instantaneous torque, the instantaneous torque being a maximum torque that can be permitted by the motor;
   calculate eccentric load torque, the eccentric load torque being load torque acting on the motor in accordance with a rotation phase of the motor while the operating pattern is being executed, in the case where the center of mass of the workpiece is eccentric relative to the rotation center of the motor and a rotation axis is not parallel to the vertical direction;
   calculate acceleration/deceleration torque arising when the motor accelerates or decelerates during the execution of the operating pattern;
   calculate a required torque from a sum of the eccentric load torque and the acceleration/deceleration torque arising during the execution of the operating pattern; and
   select the motor to drive the machine when the required torque is determined to be less than or equal to the instantaneous torque of the motor in all velocity regions in which the workpiece operates according to the operating pattern during the execution of the operating pattern,
   wherein the processor finds the eccentric load torque $T_{el}(\theta)$ at a given phase from two different sets of phases $(\theta_1, \theta_2)$ and eccentric load torques $(T_1, T_2)$ by the following equation:

$$T_{el}(\theta) = |T_{el'} \sin(\theta - \theta_{el0})|$$

$$\theta_{el0} = \tan^{-1}\left(\frac{-T_1 \cdot \sin\theta_2 + T_2 \cdot \sin\theta_1}{-T_1 \cdot \cos\theta_2 + T_2 \cdot \cos\theta_1}\right)$$

$$T_{el'} = \frac{T_1}{\sin(\theta_1 - \theta_{el0})} = \frac{T_2}{\sin(\theta_2 - \theta_{el0})}$$

where, $\sin(\theta_1 - \theta_{el0}) = 0$ or $\sin(\theta_2 - \theta_{el0})$, $T_{el}(\theta) = 0$,
$\theta_{el0}$: a phase at which the eccentric load torque is 0,
$\theta_1, \theta_2$: given phases,
$T_1$: the eccentric load torque at a phase $\theta_1$,
$T_2$: the eccentric load torque at a phase $\theta_2$.

2. The motor selection apparatus of claim 1, wherein the processor further:
   finds a friction torque by multiplying a distance between a friction surface and the rotation center of the motor by a friction force, and
   calculates the required torque by adding the friction torque to the eccentric load torque.

3. The motor selection apparatus of claim 2, wherein the processor further:
   uses information of a motor used in a similar machine to find a polynomial approximation of a friction torque function, and calculates a friction coefficient from the friction torque function; and
   calculates the friction torque for a machine being considered from the friction coefficient, and calculates the required torque by adding the friction torque to the eccentric load torque of the machine being considered.

* * * * *

UNITED STATES PATENT AND TRADEMARK OFFICE
CERTIFICATE OF CORRECTION

PATENT NO. : 10,691,099 B2
APPLICATION NO. : 15/915523
DATED : June 23, 2020
INVENTOR(S) : Yasuo Yamada Page 1 of 1

It is certified that error appears in the above-identified patent and that said Letters Patent is hereby corrected as shown below:

Claim 1, Column 12, Line 21: delete "where, $\sin(\theta_1-\theta_{el0}) = 0$ or $\sin(\theta_2-\theta_{el0})$, $T_{el'}(\theta) = 0$" and insert -- where, if $\sin(\theta_1-\theta_{el0}) = 0$ or $\sin(\theta_2-\theta_{el0}) = 0$, $T_{el'}(\theta) = 0$ --

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*